United States Patent
Singh et al.

(10) Patent No.: US 11,698,049 B2
(45) Date of Patent: Jul. 11, 2023

(54) VALVE FOR METERING A FLUID

(71) Applicant: Robert Bosch GmbH, Stuttgart (DE)

(72) Inventors: Anish Singh, Stuttgart West (DE); Joachim Stilling, Pfaffenhofen (DE); Martin Buehner, Backnang (DE); Nico Herrmann, Rastatt (DE); Philipp Rauschenberger, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 108 days.

(21) Appl. No.: 16/957,282

(22) PCT Filed: Nov. 23, 2018

(86) PCT No.: PCT/EP2018/082311
§ 371 (c)(1),
(2) Date: Jun. 23, 2020

(87) PCT Pub. No.: WO2019/137680
PCT Pub. Date: Jul. 18, 2019

(65) Prior Publication Data
US 2021/0062771 A1 Mar. 4, 2021

(30) Foreign Application Priority Data
Jan. 11, 2018 (DE) .......................... 102018200364.5

(51) Int. Cl.
*F02M 51/06* (2006.01)
*B05B 1/30* (2006.01)
(Continued)

(52) U.S. Cl.
CPC ....... *F02M 51/0685* (2013.01); *B05B 1/3053* (2013.01); *F02M 61/10* (2013.01);
(Continued)

(58) Field of Classification Search
CPC .. B05B 1/3053; F02M 61/10; F02M 51/0685; F02M 61/12; F02M 51/0671; H01F 7/081; H01F 7/1638
See application file for complete search history.

(56) References Cited

U.S. PATENT DOCUMENTS

| 4,763,091 A | 8/1988 | Lang | |
| 5,029,807 A * | 7/1991 | Fuchs | F16K 31/082 |
| | | | 251/65 |

(Continued)

FOREIGN PATENT DOCUMENTS

| CN | 101213394 A | 7/2008 |
| CN | 104321554 A | 1/2015 |

(Continued)

OTHER PUBLICATIONS

International Search Report for PCT/EP2018/082311, dated Feb. 19, 2019.

*Primary Examiner* — Christopher R Dandridge
(74) *Attorney, Agent, or Firm* — Norton Rose Fulbright US LLP; Gerard Messina

(57) ABSTRACT

A valve for metering a fluid, including an electromagnetic actuator and a valve needle which is actuatable by an armature of the actuator and used to actuate a valve closing body which cooperates with a valve seat surface to form a seal seat. The armature is movably guided at the valve needle in the process. A stop element connected to the valve needle limits a relative movement between the armature and the valve needle in connection with an actuation of the valve needle. At least one elastically deformable spacer element is provided between the armature and the stop element, which, during the limitation of the relative movement between the armature and the valve needle at the stop element, encloses an attenuation space provided between a front face of the (Continued)

armature and a stop element surface of the stop element facing the front face of the armature.

8 Claims, 3 Drawing Sheets

(51) Int. Cl.
    *F02M 61/10*     (2006.01)
    *H01F 7/08*     (2006.01)
    *H01F 7/16*     (2006.01)

(52) U.S. Cl.
    CPC ........... *H01F 7/081* (2013.01); *H01F 7/1638* (2013.01); *H01F 2007/086* (2013.01)

(56) References Cited

U.S. PATENT DOCUMENTS

| | | | | |
|---|---|---|---|---|
| 6,367,769 | B1 * | 4/2002 | Reiter | ............ F02M 51/0671 239/585.5 |
| 2003/0155440 | A1 | 8/2003 | Reiter | |
| 2010/0065021 | A1 * | 3/2010 | Hayatani | ............ F02M 51/0685 239/585.5 |
| 2015/0247479 | A1 * | 9/2015 | Maeurer | ............ F02M 51/066 239/585.2 |

FOREIGN PATENT DOCUMENTS

| | | | | |
|---|---|---|---|---|
| CN | 104321555 | A | 1/2015 | |
| CN | 204458153 | U | 7/2015 | |
| CN | 106401823 | A | 2/2017 | |
| DE | 3139948 | A1 | 4/1983 | |
| DE | 19849210 | A1 | 4/2000 | |
| DE | 102004037250 | A1 | 2/2006 | |
| DE | 2634413 | * | 9/2013 | ........... F02M 51/066 |
| DE | 102015217513 | A1 | 3/2017 | |
| EP | 2789844 | A1 | 10/2014 | |
| EP | 2985445 | A1 | 2/2016 | |
| EP | 3260695 | A1 | 12/2017 | |
| FR | 2828254 | A1 | 2/2003 | |
| WO | 02068811 | A1 | 9/2002 | |
| WO | WO0295215 | * | 11/2002 | ........... F02M 51/06 |
| WO | 2011060864 | A1 | 5/2011 | |
| WO | 2013182318 | A1 | 12/2013 | |

* cited by examiner

VALVE FOR METERING A FLUID

FIELD

The present invention relates to a valve for metering a fluid, in particular to a fuel injector for internal combustion engines. Specifically, the present invention relates to the field of injectors for fuel injection systems of motor vehicles, in which preferably a direct injection of fuel into combustion chambers of an internal combustion engine takes place.

BACKGROUND INFORMATION

A fuel injector which is used for fuel injection systems of internal combustion engines is described in German Patent Application No. DE 10 2015 217 513 A1. The fuel injector described therein includes a valve needle, which cooperates with a valve seat surface to form a seal seat, and an armature situated at the valve needle which is acted upon by a return spring in a closing direction and cooperates with a solenoid coil. The armature is overhung between two stops at the valve needle.

SUMMARY

A valve according to an example embodiment of the present invention may have the advantage that an improved design and operating mode as well as a simple assembly are enabled. In particular, an advantageous attenuation of the armature during a closing process may be achieved with a reduced design complexity. The measures described herein allow advantageous refinements of the example valve.

At the example valve for metering the fluid, the armature (solenoid armature) is not fixedly connected to the valve needle, but is overhung between stops. At least one stop is formed by a provided stop element. A stop element may be implemented by a stop sleeve, a stop ring or the like. The stop element, however, may also be formed at the valve needle. With the aid of at least one spring, the armature, in the rest state, is adjusted to a stop which is stationary with respect to the valve needle, so that the armature rests against it. When the valve is activated, the entire armature free travel is available as an acceleration distance. The stop, against which the armature rests in the rest state, is preferably implemented by the provided stop element.

An armature overhung at the valve needle results in the advantages, compared to a fixed connection of the armature with the valve needle or a one-piece needle, among other things, that due to the arising pulse of the armature during opening, at the same magnetic force the valve needle may be reliably opened even at higher pressures, in particular, fuel pressures, which is referred to as dynamic mechanical reinforcement, and that a decoupling of the involved masses takes place, due to which the resulting impact forces at the valve seat surface are divided among two pulses.

However, specific problems arise, which are associated with the armature being overhung at the valve needle. During the closing of the valve, the armature rebounds again after striking against the stop situated close to the valve closing body. As a result, it is possible that the entire armature free travel is passed through again, and the armature, when striking against the stop situated further away from the valve closing body, still has so much energy that the valve needle is briefly lifted out of its seat again. This may cause undesirable subsequent injections, which result in increased harmful substance emissions and increased fuel consumption. Still, even if the armature does not pass through the entire armature free travel during the rebound, it still requires some time until it settles. If a renewed activation occurs prior to the final settlement, which is relevant in the case of multiple injections with short pause periods between multiple injections, the valve function is no longer robust. It is thus possible that the impact pulses accordingly increase or decrease and that, in the most unfavorable case, the valve does not open at all any more since the impact pulse is no longer sufficiently large to do so.

As a result of the arrangement of at least one elastically deformable spacer element in accordance with the present invention, which is provided at the relevant stop for the armature, it may advantageously be achieved that an armature rebound is prevented or at least considerably reduced. In this way, such specific problems, as mentioned above, may be resolved. Among other things, a more robust multiple injection capability may be achieved thereby, at short pause times. Moreover, lower impact pulses during closing may be achieved, which reduces the wear at the armature and the stops as well as at the seal seat. This also results in reduced function change over the service life of the valve. A noise reduction is furthermore also achieved thereby. In this way, it may be advantageously achieved that a rebound height of the armature during the closing of the valve, after striking on the relevant stop, is reduced, and the armature quickly reaches its rest position. Correspondingly, the functional capability may possibly also be improved with respect to an opening. Avoiding a bouncing when the valve is opening improves the injection behavior, for example, since the opening occurs in a controlled and reproducible manner, and the closing movement, since in this regard the control signal is then decisive, and no superposition due to rebound movements occurs.

The valve closing body, which is actuated by the valve needle, may be designed in one piece with the valve needle. The valve closing body may be designed as a spherical or conical valve closing body, or also in another manner.

In this way, armature bouncing may advantageously be reduced as a result of an increased attenuation of the armature movement. Depending on the design, the attenuation of the armature movement is possible by a fluid attenuation or hydraulic attenuation and, if necessary, additionally by mechanical friction. In this way, a robust multiple injection capability may be achieved, with short pause times. As a result, impact pulses, in particular, during the closing of the valve, may be decreased, which enables less wear at the stop element. Furthermore, a reduced functional change results over the service life since the contact surface of the armature and the stop surface of the stop element change only little over the service life as a result of the improved attenuation. Moreover, decreased noise emissions arise.

A refinement of the present invention, i.e., the armature is situated in an armature space filled with a liquid fluid, and, during the limitation of the relative movement between the armature and the valve needle at the stop element, liquid fluid is displaced from the attenuation space, may have the advantage that an advantageous hydraulic attenuation may be implemented. The liquid fluid which is provided in the armature space may, in particular, be the fluid which is metered by the valve. However, it is also possible for the armature space to be filled with a hydraulic fluid. This is, in particular, possible when the fluid to be metered is a gaseous fluid. In accordance with another refinement, in particular, micro gaps may be provided between the front face of the armature and the spacer element, via which the liquid fluid is at least partially displaced from the attenuation space. A portion of the liquid fluid may, for example, also be displaced from the attenuation space via the guide gap between the valve needle and the armature or via gaps designed, in particular, as micro gaps between the spacer element and the stop element surface of the stop element.

Another refinement of the present invention, i.e., the spacer element cooperates with the front face of the armature in such a way, and the guide gap between the valve needle and the armature is configured in such a way, that the pressure in the attenuation space rises during the displacement of the liquid fluid from the attenuation space and, after a movement reversal, when the front face of the armature moves away from the stop element surface again, a temporary underpressure in the attenuation space compared to the armature space is generated, may have the advantage that a hydraulic movement attenuation is achieved both when the armature approaches the relevant stop element, as well as during a subsequent movement of the armature away from the stop element, i.e., a rebound. Initially, the temporary overpressure in the attenuation space has a decelerating effect on the armature, and after the movement reversal the temporary underpressure in the attenuation space counteracts the movement of the armature away from the stop element. The hydraulic forces resulting on the armature thus result in a faster settling of the armature in the armature space. In contrast to a hydraulic attenuation, which is caused by the displacement of fluid in the armature space by the armature during its movement, the attenuation with the aid of the temporary overpressure and the temporary underpressure in the attenuation space only acts at the end of the movement of the armature, whereby the dynamics of the armature, in particular, at the beginning of the actuation, is not impaired.

Another refinement of the present invention may have the advantage that the hydraulic attenuation may be supported by a friction attenuation. A friction may arise in this regard with respect to the front face of the armature and/or with respect to the stop element surface of the stop element. When exactly one spacer element is provided between the front face of the armature and the relevant stop element, it may enable the generation of attenuating frictional forces with respect to either the front face of the armature or the stop element surface, or also both the front face of the armature and the stop element surface. When multiple spacer elements are provided, either the spacer element situated at the front face of the armature or the spacer element situated at the stop element surface, or also these two spacer elements, may enable a contribution to the friction attenuation via corresponding frictional forces. When multiple spacer elements are provided, according to another refinement of the present invention, a friction may be made possible in each case between adjoining spacer elements, which at least contributes to the friction attenuation.

Another example refinement according to the present invention may have the advantage that the volume of the attenuation space and the volume of the fluid displaceable during the attenuation may be increased.

In another refinement according to present invention, the spacer element may, for example, be implemented as a conically shaped disk or similarly to a disk spring. The spacer element is thus able to flexibly yield, by which more fluid is displaced compared to rigid stops, which contributes to the attenuation of the movement. In particular, due to the design as a conical disk, fluid is enclosed between the spacer element, the armature and the stop element, by which, in contrast to coil springs or other elastic stops, which are not able to enclose a fluid volume, an overpressure and, if necessary, an underpressure is generated in the attenuation space in relation to the armature space, which acts, in particular, at the front face of the armature, and thus makes a movement-attenuating contribution.

Another refinement of the present invention may have the advantage that the spacer element may be reliably positioned at the stop element surface of the stop element. According to another refinement of the present invention, both an advantageous positioning of the spacer element and a reduction in the remaining volume in the attenuation space, are possible with a maximum deflection of the spacer element.

BRIEF DESCRIPTION OF THE DRAWINGS

Preferred exemplary embodiments of the present invention are described in greater detail in the description below with reference to the figures, in which corresponding elements are provided with concurring reference numerals.

DETAILED DESCRIPTION OF EXAMPLE EMBODIMENTS

Figure 1:
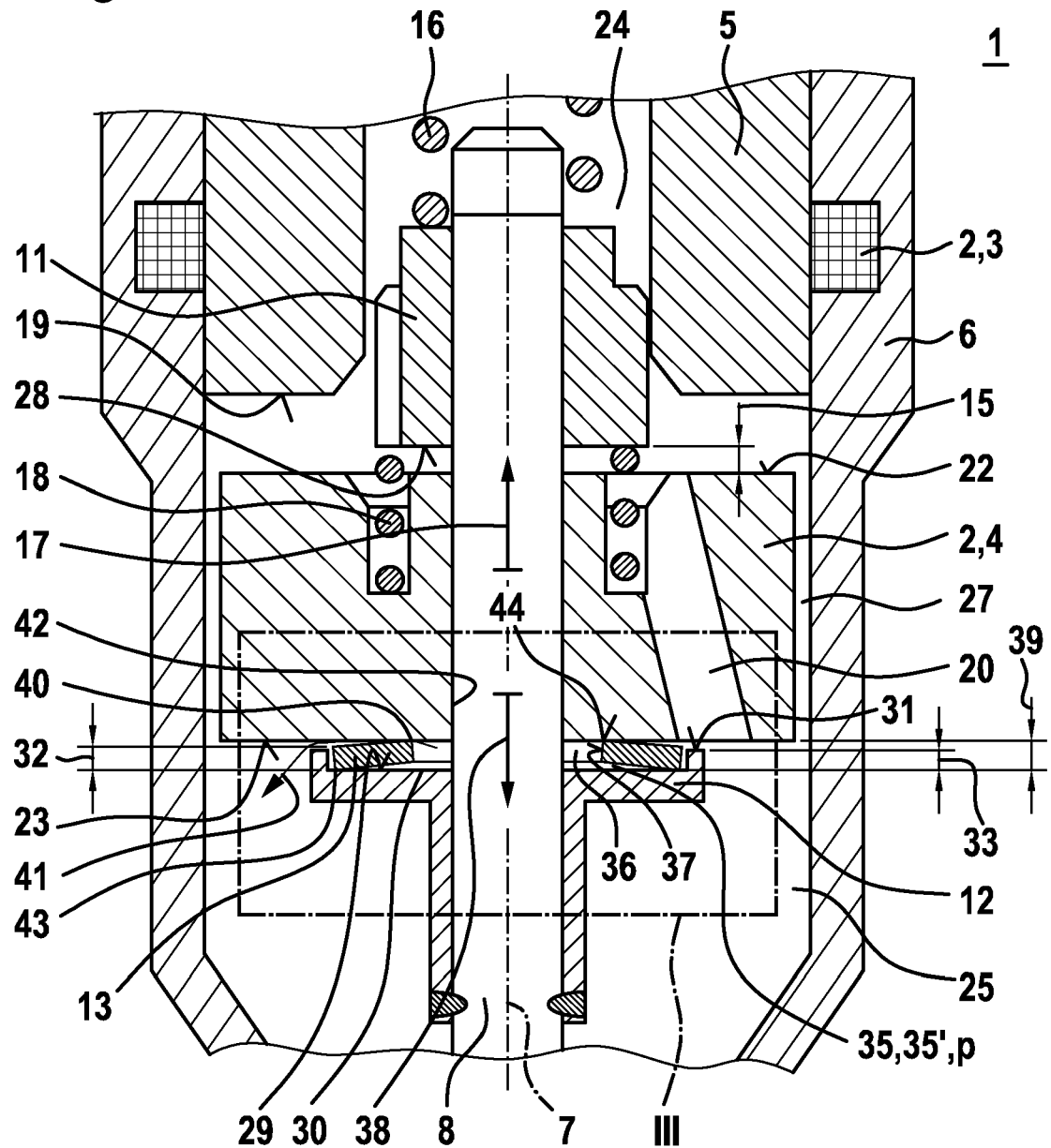
FIG. 1 shows a valve in an excerpted, schematic sectional representation corresponding to a first exemplary embodiment of the present invention.
Figure 1:
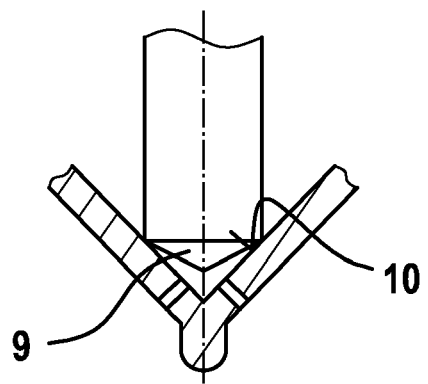

FIG. 1 shows a valve 1 for metering a fluid in an excerpted, schematic sectional representation corresponding to a first exemplary embodiment. Valve 1 may, in particular, be designed as a fuel injector 1. A preferred application is a fuel injection system in which such fuel injectors 1 are designed as high pressure injectors 1 and used to inject fuel directly into assigned combustion chambers of the internal combustion engine. For this purpose, liquid or gaseous fuels may be used as the fuel.

Valve 1 includes an actuator 2, which encompasses a solenoid coil 3 and an armature 4. By energizing solenoid coil 3, a magnetic circuit is closed via an inner pole 5, an armature 4, and an at least partially magnetically conducting housing 6. Inner pole 5 is fixedly connected to housing 6.

Valve 1 includes a valve needle 8 which is adjustable within housing 6 along a longitudinal axis 7 and at which a valve closing body 9 is provided. Valve closing body 9 cooperates with a valve seat surface 10 to form a seal seat. Valve closing body 9 may have a sphere-shaped, partial sphere-shaped or another design. Valve closing body 9 may furthermore be designed in one piece with valve needle 8.

Stops 11, 12 are situated at valve needle 8 and fixedly connected to valve needle 8. Stops 11, 12 are designed as stop elements 11, 12, in this exemplary embodiment a spacer element 13 being provided between stop element 12 and armature 4. Armature 4 is movable between stops 11, 12, it being guided at valve needle 8. In this regard, an armature free travel 15 is predefined in an initial position in which spacer element 13 is relaxed. Depending on the design, stop element 11 and/or stop element 12 may be designed, for example, in the form of a stop ring and/or of a stop sleeve. In a modified embodiment, at least one of stop elements 11, 12 may also be formed at valve needle 8.

In this exemplary embodiment, valve needle 8 is acted upon via stop element 11 by a return spring 16, which moves valve closing body 9 with the aid of valve needle 8 against valve seat surface 10. In this way, valve 1 is held closed in the rest state.

Solenoid coil 3 is energized for the actuation of valve 1, by which armature 4 is actuated in an opening direction 17 along longitudinal axis 7 against the force of an armature free travel spring 18. Return spring 16 initially holds valve needle 8 in its initial position in the process. As a result of the acceleration of armature 4, a movement pulse, which results in the opening of the valve needle 8, is transmitted to valve needle 8 during the impact against stop 11. Valve needle 8 is then also accelerated. After armature 4 has struck against stop 19 of inner pole 5, valve needle 8 continues its movement in opening direction 17 due to its inertia, a movement reversal occurring due to the force of return spring 16. Thereafter, valve needle 8, during its movement counter to opening direction 17, or stop 11 again strikes on armature 4, which ideally rests at inner pole 5 up until this point in time.

Armature 4 has one or preferably multiple through-borehole(s) 20, which extend(s) from a front face 22 of armature 4 to a front face 23 of armature 4. During operation, the fluid, in particular, the fuel, is conducted through an axial through-borehole 24 formed at inner pole 5 to, and then onward through, an armature space 25, to the seal seat formed between valve closing body 9 and valve seat surface 10. Valve needle 8 may be guided via stop element 11 and inner pole 5 in the process along longitudinal axis 7 in housing 6. Through-boreholes 20 enable a flow through armature 4, by which an annular gap 27 between armature 4 and housing 6 may be reduced.

A stop element surface 28, against which armature 4 strikes with its front face 22 during an actuation, is provided at stop element 11. Furthermore, a stop element surface 29, which faces front face 23 of armature 4, is formed at stop element 12. In this exemplary embodiment, a recess 30 is configured at stop element 12, into which stop element 13 is partially inserted. Furthermore, an outer annular surface 31 is configured at stop element 12. A height 32, viewed along longitudinal axis 7, of spacer element 13 designed as a conical annular disk is larger than an axial distance 33, viewed along longitudinal axis 7, between outer annular surface 31 and stop element surface 29 so that, in any case, a direct contact between stop element 12 and armature 4 is prevented, and at least a certain flow-through gap always remains between front face 23 of armature 4 and outer annular surface 31 of stop element 12.

As a result of spacer element 13, an attenuation space 35 is formed between front face 23 of armature 4 and stop element surface 29 of stop element 12. Attenuation space 35 has a volume 35', which encompasses a volume 36 of a through-opening 37 formed at stop element 8.

When armature 4 moves in closing direction 38, which is oriented opposite opening direction 17, spacer element 13 is elastically deformed, an axial extension 39 of attenuation space 35 predefined by spacer element 13 being shortened. In this way, volume 35' of attenuation space 35 decreases. The liquid fluid provided in attenuation space 35 is thus compressed and displaced from attenuation space 35. The displacement may take place via a gap 40, designed as a micro gap 40, between spacer element 13 and armature 4, as is illustrated by way of example by arrow 41. The liquid fluid may furthermore also be displaced from attenuation space 35 via a guide gap 42 between valve needle 8 and armature 4. In principle, a displacement is also possible via gaps 43 designed as micro gaps between stop element surface 29 of stop element 12 and spacer element 13. In the borderline case, volume 35' of attenuation space 35 may only still be formed by volume 36 of through-opening 37 when spacer element 13 is completely deflected. Depending on the application case, however, spacer element 13 may also be designed in such a way that such a complete deflection does not occur.

During a closing movement of armature 4, a temporary increase in pressure p thus occurs in attenuation space 35 compared to armature space 25. This results in hydraulic forces at armature 4, which act counter to closing direction 38. Subsequently, after a movement reversal of armature 4 has occurred, a reduced pressure p results in attenuation space 35 due to the increase in volume 36, which causes a temporary underpressure p in attenuation space 35 compared to armature space 25. This results in hydraulic force conditions at armature 4 which counteract the movement of armature 4 in opening direction 17. As a result, a directionally dependent attenuation of armature 4 occurs, and thus a rapid settling of armature 4. In the settled initial state, pressure p in attenuation space 35 then equalizes with respect to the pressure in armature space 25, so that no negative influencing of the actuator dynamics due to pressure p occurs during a renewed actuation of armature 4 out of its initial position. In addition, it results in the advantage that a hydraulic adhesion effect at the beginning of an actuation is decreased since armature 4 is supported at a contact line 44 or a small contact surface 44.

Moreover, a frictional force may act at contact line 44 or at the small contact surface 44 between spacer element 13 and armature 4 during the deceleration of armature 4, by which additionally a friction attenuation is achieved.

Figure 2:
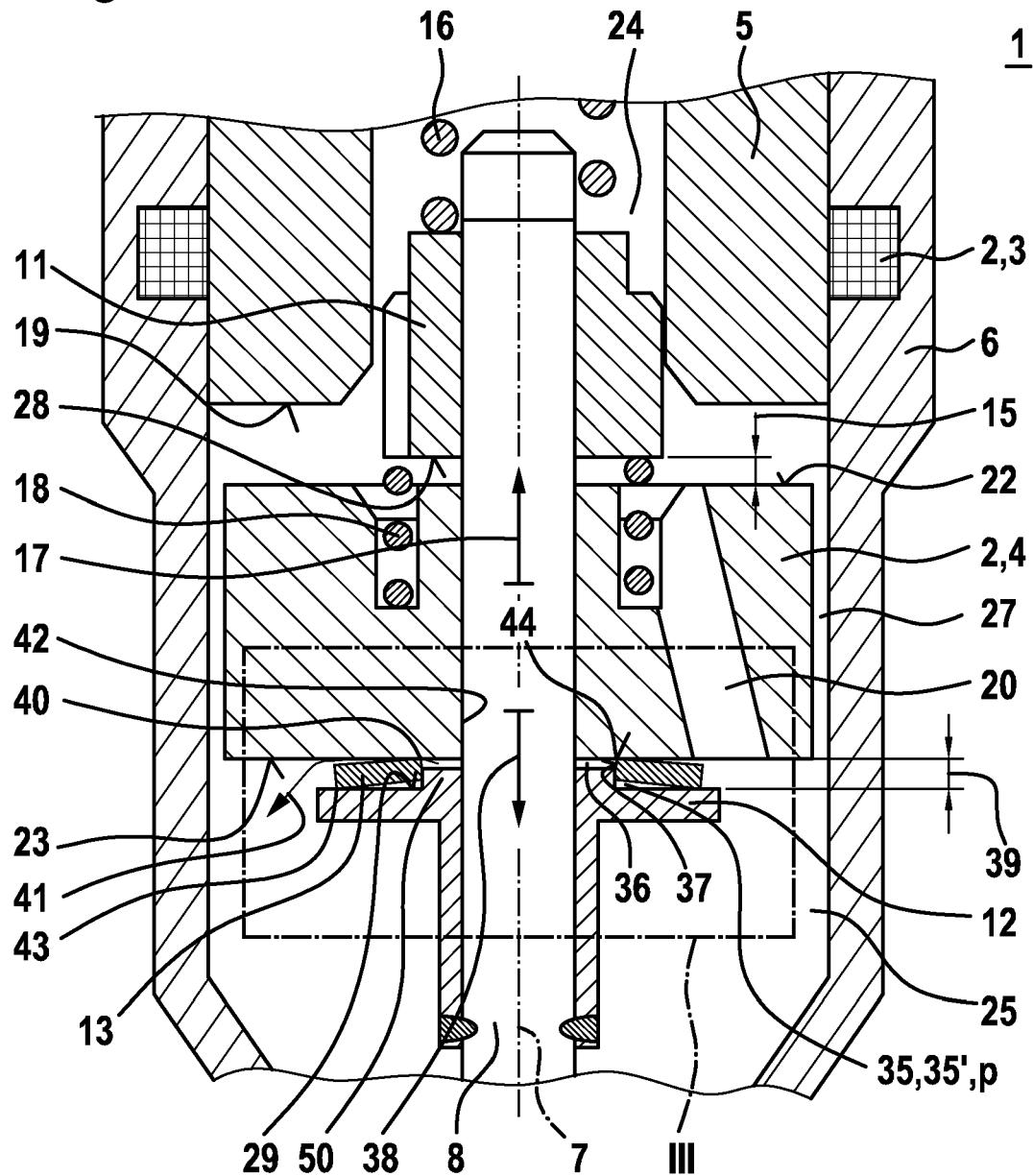
FIG. 2 shows a valve in an excerpted, schematic sectional representation corresponding to a second exemplary embodiment of the present invention.
Figure 2:
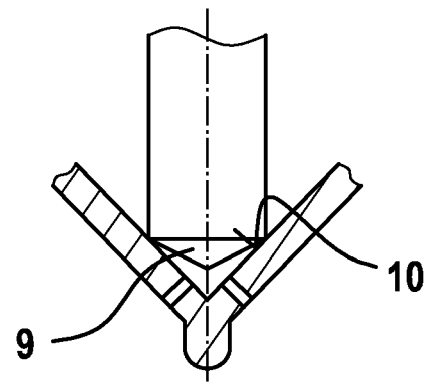

FIG. 2 shows a valve 1 in an excerpted, schematic sectional representation corresponding to a second exemplary embodiment. In this exemplary embodiment, an elevation 50 is formed at stop element 12. In a relaxed initial position of spacer element 13, elevation 50 is preferably already slightly situated in through-opening 37 of spacer element 13. In this way, a reliable positioning of spacer element 13 with respect to valve needle 8 is possible. If necessary, a recess 30, as is shown in FIG. 1, may additionally be provided, into which spacer element 13 is inserted. During a deflection of spacer element 13 for the deceleration of armature 4 during the movement of armature 4 in closing direction 38, fluid is displaced by elevation 50 from volume 36 of through-opening 37. In this way, the remaining volume 35' of attenuation space 35, in absolute terms, may be further decreased when spacer element 13 is in the fully deflected state or in the design-related maximally deflected state. In this way, a particularly high pressure increase in attenuation space 35 may be achieved. Furthermore, due to the underpressure, an advantageous reduction of the spring energy stored in spacer element 13 results when armature 4, after the movement reversal, is adjusted in opening direction 17 again to relax spacer element 13.

Figure 3:
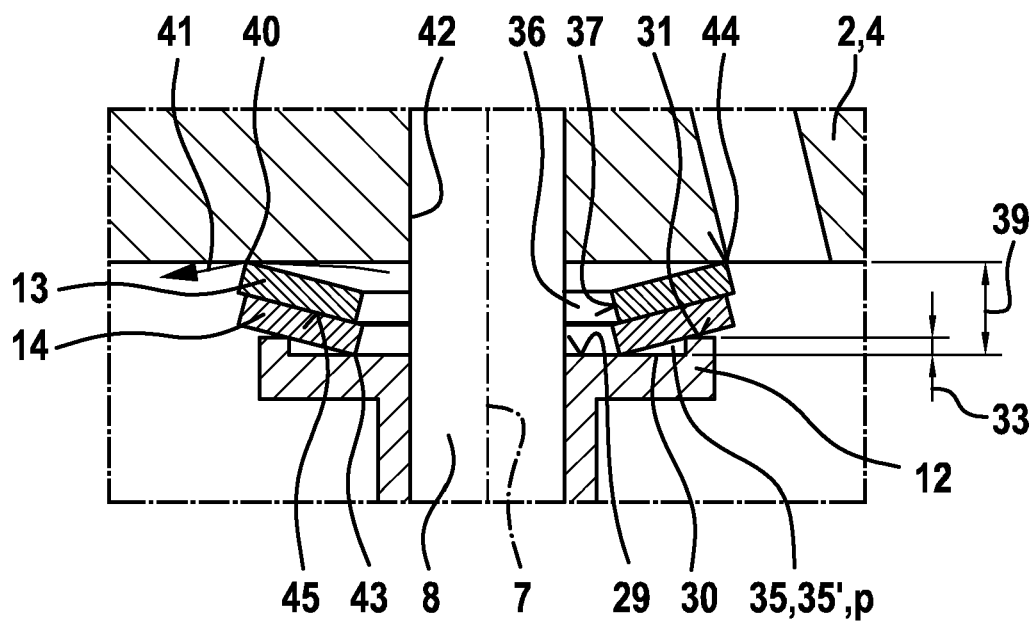
FIG. 3 shows the section of the valve denoted by III in FIG. 1 corresponding to a third exemplary embodiment.

FIG. 3 shows the section of valve 1 denoted by III in FIG. 1 corresponding to a third exemplary embodiment. In this exemplary embodiment, two spacer elements 13, 14 are provided. In a modified embodiment, it is also possible for more than two spacer elements 13, 14 to be provided. A first spacer element 13 may be situated at front face 23 of armature 4, while a second spacer element 14 is situated at stop element 12. Spacer elements 13, 14 are situated relative to one another in such a way that a contact surface 45 results therebetween. Relative position changes occur during an elastic deflection of spacer elements 13, 14, which result in friction at contact surface 45. In this way, a friction attenuation occurs, which is achieved by the friction between first spacer element 13 and second spacer element 14. In addition, friction may occur as it is explained based on FIG. 1. A friction may occur in the process between first spacer element 13 and armature 4 and/or a friction may occur between second spacer element 14 and stop element 12.

Figure 4:
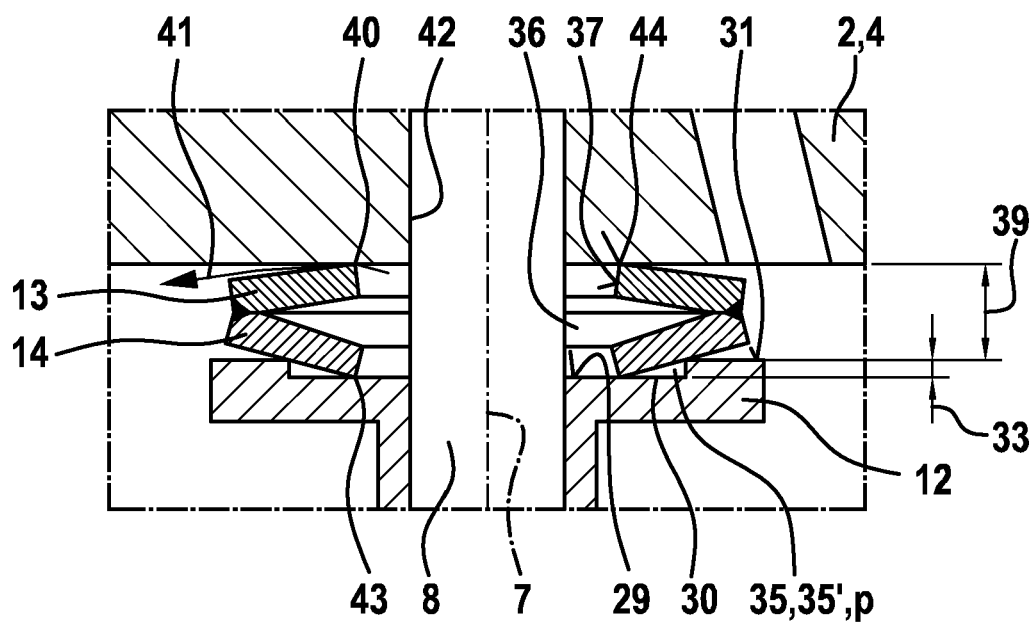
FIG. 4 shows the section of the valve denoted by III in FIG. 1 corresponding to a fourth exemplary embodiment.

FIG. 4 shows the section of valve 1 denoted by III in FIG. 1 corresponding to a fourth exemplary embodiment. In this exemplary embodiment, two spacer elements 13, 14 are provided, which are situated between front face 23 of armature 4 and stop element surface 29 of stop element 12. The two spacer elements 13, 14 are supported with respect to one another in the process in such a way that a spring action of these two spacer elements 13, 14 is additively compounded of the spring action of the one spacer element 13 and the spring action of the other spacer element 14. In this way, volume 35' of attenuation space 35 may be accordingly increased. This results in a greater displacement of fluid from attenuation space 35. The at least two spacer elements 13, 14 may, if necessary, be connected to one another at their outer circumference or at their inner circumference. However, modified embodiments are also possible, in which a displacement of fluid from attenuation space 35 is possible, for example, via suitable gaps between spacer elements 13, 14.

In one modified embodiment, at least one spacer element may be provided additionally or alternatively between stop element 11 and armature 4, which is designed corresponding to spacer element 13, 14, which, corresponding to one of the embodiments and operating principles described based on FIGS. 1 through 4, enables a hydraulic attenuation with the aid of an attenuation space and, if necessary, also an attenuation based on friction. In this way, a bouncing may be reduced during the opening of valve 1.

The present invention is not limited to the described exemplary embodiments.

What is claimed is:

1. A valve for metering a fluid, comprising:
   an electromagnetic actuator situated in a housing;
   a valve needle which is actuatable by an armature of the actuator and used to actuate a valve closing body which cooperates with a valve seat surface to form a seal seat, the armature being movably guided at the valve needle;
   at least one stop element connected to the valve needle and, in connection with an actuation of the valve needle, limits a relative movement between the armature and the valve needle; and
   at least one elastically deformable spacer element situated between the armature and the at least one stop element, which, during a limitation of the relative movement between the armature and the valve needle at the at least one stop element, encloses an attenuation space situated between a front face of the armature and a stop element surface of the at least one stop element facing the front face of the armature, and, during the limitation of the relative movement between the armature and the valve needle at the at least one stop element, a volume of the attenuation space is reduced,
   wherein the armature is situated in an armature space filled with a liquid fluid, and, during the limitation of the relative movement between the armature and the valve needle at the at least one stop element, at least some of the liquid fluid is displaced from the attenuation space,
   wherein the at least some of the liquid fluid is displaced from the attenuation space: (i) via at least one gap between the front face of the armature and the spacer element and (ii) via a guide gap between the valve needle and the armature,
   wherein an elevation is formed at the at least one stop element surface of the at least one stop element adjacent to the valve needle, and the at least one spacer element, at least during the limitation of the relative movement between the armature and the valve needle at the at least one stop element, is deformed in such a way that the elevation at least partially displaces a volume from a through-opening formed at the at least one stop element, and
   wherein the elevation transversally opposes the spacer element and prevents contact between the armature and the stop element,
   wherein the spacer element is conically shaped.

2. The valve as recited in claim 1, wherein the valve is a fuel injector for an internal combustion engine.

3. The valve as recited in claim 1, wherein the spacer element cooperates with the front face of the armature in such a way, and the guide gap between the valve needle and the armature is configured in such a way, that a pressure in the attenuation space rises during the displacement of the liquid fluid from the attenuation space and, after a movement reversal, when the front face of the armature moves away from the at least one stop element surface again, a temporary underpressure in the attenuation space compared to the armature space is generated.

4. The valve as recited in claim 1, wherein the at least one spacer element is supported at the front face of the armature in such a way that, during the limitation of the relative movement between the armature and the valve needle at the at least one stop element, a friction attenuation is achieved, and/or the at least one spacer element is supported at the at least one stop element surface in such a way that, during the limitation of the relative movement between the armature and the valve needle at the at least one stop element, a friction attenuation is achieved.

5. The valve as recited in claim 1, wherein the at least one spacer element includes at least one first spacer element and one second spacer element are provided, which are situated between the front face of the armature and the at least one stop element surface of the at least one stop element, and, during the limitation of the relative movement between the armature and the valve needle at the at least one stop element, a friction attenuation is at least partially achieved due to a friction between the first spacer element and the second spacer element.

6. The valve as recited in claim 1, wherein the at least one spacer elements includes at least two spacer elements, which are situated between the front face of the armature and the at least one stop element surface of the at least one stop element, and, during the limitation of the relative movement between the armature and the valve needle at the at least one stop element, the at least two spacer elements are supported with respect to one another in such a way that a spring action of the at least two spacer elements is additively compounded of a spring action of a first one of the at least two spacer elements and a spring action of another one of the at least two spacer element.

7. The valve as recited in claim 1, wherein the at least one spacer element is an at least partially conical and/or plate-shaped spacer element and/or the at least one spacer element is an annular spacer element.

8. The valve as recited in claim 7, wherein a recess is formed at the at least one stop element surface of the at least one stop element, into which the at least one spacer element is at least partially inserted.

* * * * *